United States Patent
Sanchez

(10) Patent No.: US 12,233,904 B2
(45) Date of Patent: Feb. 25, 2025

(54) SYSTEM AND METHOD FOR CONTROLLING THE JERK FOR AN AUTOMATIC VEHICLE

(71) Applicant: IVECO FRANCE S.A.S., Venissieux (FR)

(72) Inventor: Francisco Sanchez, Chaponnay (FR)

(73) Assignee: IVECO FRANCE S.A.S., Venissieux (FR)

( * ) Notice: Subject to any disclaimer, the term of this patent is extended or adjusted under 35 U.S.C. 154(b) by 296 days.

(21) Appl. No.: 17/793,533

(22) PCT Filed: Jan. 20, 2021

(86) PCT No.: PCT/IB2021/050414
§ 371 (c)(1),
(2) Date: Jul. 18, 2022

(87) PCT Pub. No.: WO2021/148956
PCT Pub. Date: Jul. 29, 2021

(65) Prior Publication Data
US 2023/0041429 A1    Feb. 9, 2023

(30) Foreign Application Priority Data
Jan. 20, 2020  (IT) .................. 102020000000976

(51) Int. Cl.
*B60W 60/00*   (2020.01)

(52) U.S. Cl.
CPC ... *B60W 60/0013* (2020.02); *B60W 2520/105* (2013.01); *B60W 2710/18* (2013.01)

(58) Field of Classification Search
CPC .............. B60T 2230/04; B60T 13/662; B60W 60/0013; B60W 2520/105; B60W 2710/18
See application file for complete search history.

(56) References Cited

U.S. PATENT DOCUMENTS

| 9,399,449 B2 | 7/2016 | Nagatsuka et al. |
| 2010/0007200 A1* | 1/2010 | Pelosse .................. B60T 7/20 303/7 |
| 2019/0023240 A1 | 1/2019 | Asano et al. |
| 2019/0232970 A1 | 8/2019 | Watanabe et al. |
| 2020/0262398 A1* | 8/2020 | Sato ...................... B60T 8/321 |
| 2021/0213941 A1* | 7/2021 | Fukasawa .......... B62D 15/0285 |

FOREIGN PATENT DOCUMENTS

| JP | 2007009885 A | 1/2007 |
| JP | 2020006952 A | 1/2020 |

OTHER PUBLICATIONS

International Search Report and Written Opinion in PCT Application No. PCT/IB2021/050414, mailed Apr. 16, 2021 (13 pages).

* cited by examiner

*Primary Examiner* — Kenneth J Malkowski
(74) *Attorney, Agent, or Firm* — Leason Ellis LLP

(57) ABSTRACT

A system for controlling the jerk in an automatic/autonomous vehicle, said system comprising processing means, which comprise a jerk calculation module configured to acquire an electric acceleration signal and calculate a jerk value of said vehicle, and a plurality of operating modules, each configured to acquire an electric braking signal and said jerk value, one of said plurality of operating modules being selected by means of a selection signal, said selected module modifying the electric braking signal as a function of said jerk value and providing a modified electric braking signal to said braking system.

10 Claims, 1 Drawing Sheet

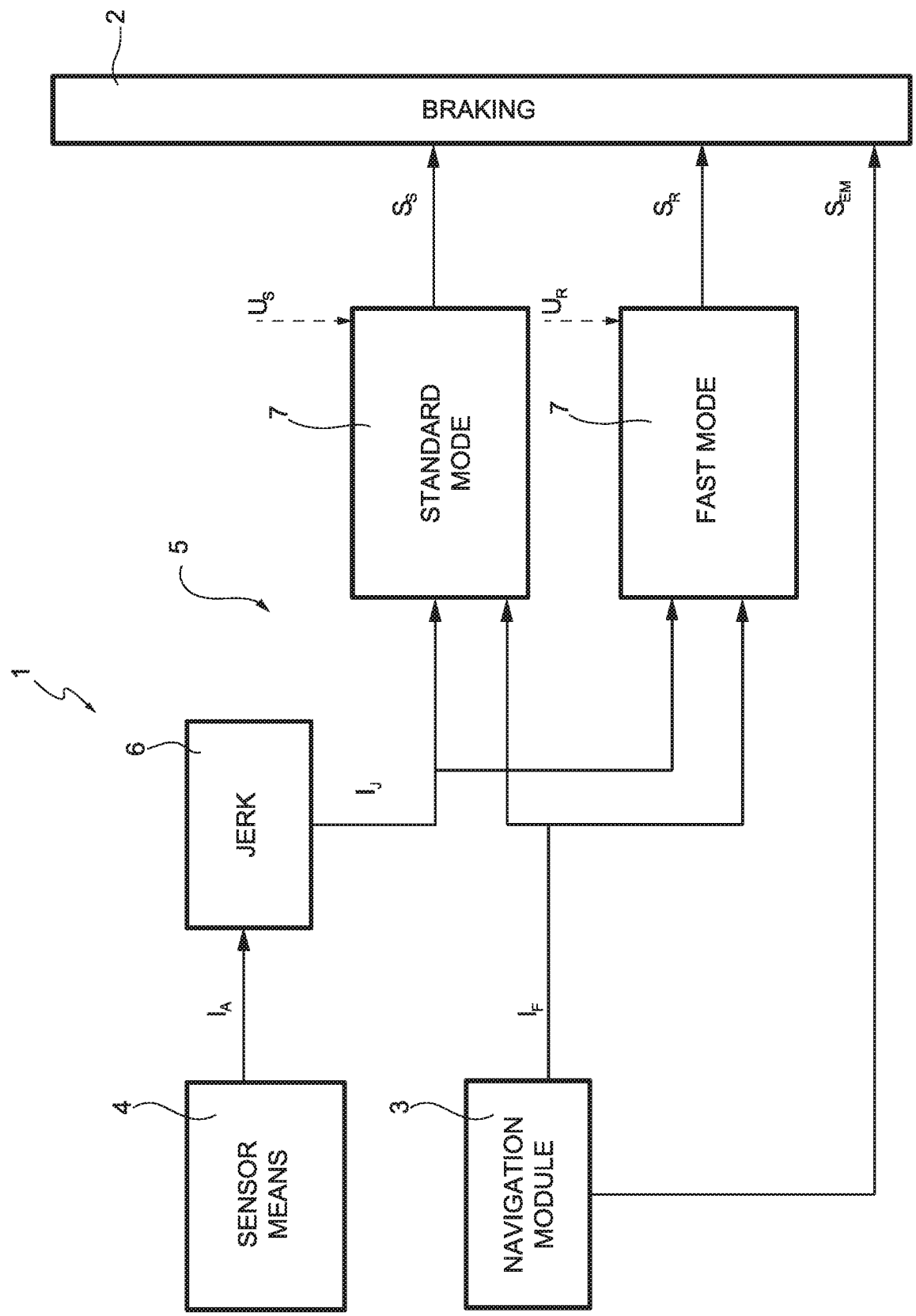

SYSTEM AND METHOD FOR CONTROLLING THE JERK FOR AN AUTOMATIC VEHICLE

CROSS-REFERENCE TO RELATED APPLICATIONS

This patent application is a U.S. National Phase Application under 35 U.S.C. § 371 of International Patent Application No. PCT/IB2021/050414, filed on Jan. 20, 2021, which claims priority from Italian patent application no. 102020000000976 filed on Jan. 20, 2020, the entire disclosure of which is incorporated herein by reference.

TECHNICAL FIELD

The present invention relates to a system and a method for controlling the jerk in an autonomous vehicle, in particular in an autonomous vehicle for public transport of passengers.

STATE OF THE PRIOR ART

In vehicles for public transport of people, i.e. in which some of the passengers may be standing during the vehicle's journey, it is known that the driver can control the acceleration to avoid jerking during the journey of the vehicle. In mathematics, the jerk is known as the derivative of the acceleration vector with respect to time, that is, the third derivative with respect to time of the position vector.

This regulation becomes extremely important in autonomous vehicles that are increasingly widespread in the urban environment. It is clear that controlling the jerk is essential to increase the safety and comfort of passengers.

One object of the present invention is therefore to propose a system and a method for automatically controlling the jerk in an automatic/autonomous vehicle, which allow maintenance of high levels of safety and comfort for the passengers.

It is also an object of the present invention to provide a system and a method which are optimized and inexpensive.

SUMMARY OF THE INVENTION

The above mentioned objects are achieved by means of a system and a method according to the appended claims.

BRIEF DESCRIPTION OF THE DRAWINGS

Further features and advantages of the invention will become more apparent from the following description, given by way of illustrative, non-limiting example, with reference to the attached drawing which schematically shows a system for controlling the jerk according to the present invention.

DETAILED DESCRIPTION OF THE INVENTION

FIG. 1 shows a system 1 for controlling the jerk in an autonomous/automatic driving vehicle (not shown).

The system 1 essentially comprises a braking system 2, a driving control module 3, sensor means 4, and processing means 5 configured to calculate, starting from the data received from the driving control module 3 and the sensor means 4, a signal for activating the braking system 2.

In particular, the braking system 2 can be of any type, provided that it is configured to receive an electric input signal $S_S$, $S_R$, $S_{EM}$ generated by the processing means 5 or by the navigation module 3, as described in detail below.

The sensor means 4 can comprise any type of sensors configured to measure the acceleration of the automatic/autonomous vehicle, such as for example accelerometers or an inertial unit. The sensor means 4 are therefore configured to generate an electric signal $I_A$ representing a value of the acceleration of the automatic/autonomous vehicle and transmit it to the processing means 5.

The driving control module 3 may comprise an electronic unit of a known type configured to generate a plurality of signals configured to control the various actuators/vehicle control systems based on the data received from the sensors which aim to acquire vehicle operating data. Since these features are known, they will not be described in further detail.

With respect to the present invention, the control module 3 is configured to generate a braking signal $I_F$ configured to be sent to the processing means 5, under normal operating conditions of the vehicle, and an emergency braking signal $S_{EM}$ configured to be sent directly to the braking system 2 and to activate it accordingly. The emergency operation is characterized by an event that requires a braking level above the comfortable braking level, for example, an obstacle close in front of the vehicle, a failure of a main system or any other event classified as such by the safety analysis; it is the vehicle supervisor program that will have to decide based on events coded within the software.

The processing means 5 comprise a jerk calculation module 6 configured to calculate the jerk value $I_J$ based on the signal $I_A$ received from the sensor means 4, and a plurality of operating modules 7 configured to modify the braking signal $I_F$ sent by the control module 3 based on the jerk value $I_J$ calculated by the jerk calculation module 6.

In greater detail, the jerk calculation module 6 is configured to calculate the jerk value based on the acceleration signal $I_A$ processed by the sensor means through known mathematical/physical relationships. The modification of the signal $I_F$ by means of a respective operating module 7 can be carried out by means of a mathematical interpolation based on coefficients/tables stored in the respective operating module 7 and obtained by experimental tests. Alternatively, the signal $I_F$ can be simply limited as a function of a threshold value stored in the respective operating module 7.

With regard to the operating modules 7, they can be provided in a number proportional to the operating modes, that is to say, of gentleness or harshness in the variation of the acceleration, that are desired to be controlled in the vehicle. In the embodiment described herein, the system 1 comprises two operating modes, in particular a standard operating mode 7 and a fast operating mode 7, respectively, which can be selected based on signals $U_S$, $U_R$ which can be emitted, for example, by the driving control module 3.

In the standard operating mode, the braking signal $I_F$ is modulated/limited as a function of the jerk signal $I_J$ to ensure the two safety conditions, i.e. that all the people standing in the vehicle are not in danger of falling during braking/acceleration, or to ensure a comfort condition, i.e. that the jerk of the vehicle shall not cause physical disturbances (e.g. nausea) to a significant percentage of the vehicle's passengers.

In the fast operating mode, the braking signal $I_F$ is modulated/limited as a function of the jerk signal $I_A$ so as to guarantee the safety condition alone, at the expense of the comfort condition. This situation can be useful under certain operating conditions, for example an object in the detection zone which implies a considerable braking action, yet still below the maximum braking performance, i.e. an uncomfortable but technically problem-free braking.

It is clear that the processing means 5 can be realized through an electronic unit of the autonomous vehicle configured to receive the above-mentioned signals, process them in the same way based on the variables stored therein, and transmit the control signal to the braking system 2. This electronic unit can obviously be integrated into one of the driving 3 or braking system 2 control modules.

The operation of the system 1 described above is as follows and is repeated continuously while the vehicle is being driven.

As described above, the sensor means 4 detect the acceleration value $I_A$ which is used by the jerk calculation module 6 to process a jerk signal $I_J$ which is received by the operating module 7 selected on the basis of the signal $U_S$, $U_R$ among the plurality of operating modules present. The latter also receives the desired braking signal $I_F$ from the control module 3. The selected operating module 7 will then modify the braking signal $I_F$ to provide a respective signal $S_S$, $S_R$ to the braking system 2, which will brake (or accelerate) accordingly. This variation will be detected by the sensor means 4 and the steps described below will be repeated continuously.

If an emergency condition is detected, the control module 3 will send an emergency signal $S_{EM}$ to the braking system 2, which will brake directly, bypassing the processing of the processing means 5 described above.

Based on the foregoing, it is clear that the invention of the present invention also relates to a jerk control method comprising the following steps:
- detecting an acceleration signal $I_A$ of the automatic/autonomous drive vehicle;
- calculating the jerk value of the vehicle $I_J$ based on the acceleration signal $I_A$ detected;
- selecting a braking modality 7 of the automatic/autonomous drive vehicle;
- modifying/limiting a braking signal $I_F$ set by a control module 3 of the automatic/autonomous drive vehicle according to a selected operating modality 7;
- sending a modified braking signal $S_S$, $S_R$ to the braking system 2 of the automatic/autonomous vehicle.

Parallel to the steps set out above, the method also comprises a step of direct emergency activation of the braking system 2, independently of the jerk signal $I_J$, as described.

The steps of the method described above can be included in an electronic box of the vehicle, for example the ECU advantageously containing the same control module 3.

The advantages of a jerk control system 1 and of a method according to the present invention are clearly evident from the foregoing.

The system described herein allows the jerk of an automatic/autonomous vehicle for public transport of people to be automatically controlled, while ensuring the safety and comfort of the passengers.

Moreover, the control system described herein can be integrated into other electronic units intended for vehicle control, with consequent savings and optimizations.

Lastly, it is clear that modifications and variations may be made to the jerk control system 1 and the method according to the present invention, without however departing from the scope of protection defined by the claims.

For example, it is clear that the methods of calculating the jerk or the modification of the braking signal can be any, according to the size and type of the automatic/autonomous driving vehicle for public transport of people.

Similarly, as indicated, the operating modes 7 can be many, and the sensor means 4 can be of any type.

The invention claimed is:

1. A system (1) for controlling the jerk for an automatic/autonomous vehicle, said system comprising:
   sensor means (4) configured to measure the acceleration of said vehicle and provide an electric signal ($I_A$) indicating said acceleration,
   a driving control module (3) of said vehicle configured to provide an electric braking signal ($I_F$, $S_{EM}$) and
   a braking system (2) configured to brake said vehicle as a function of an electric input signal ($S_S$, $S_R$, $S_{EM}$),
   said system (1) comprising processing means (5) which comprise a jerk calculation module (6) configured to acquire said electric signal ($I_A$) and calculate a jerk value ($I_J$) of said vehicle and a plurality of operating modules (7), each configured to acquire said electric braking signal ($I_F$, $S_{EM}$) and said jerk value ($I_J$),
   one of said plurality of operating modules (7) being selected by means of a selection signal ($U_S$, $U_R$), said selected module modifying the electric braking signal ($I_F$, $S_{EM}$) as a function of said jerk value ($I_J$) and providing a modified electric braking signal ($S_S$, $S_R$) to said braking system (2), the plurality of operating modules including a first and a second operating module (7), said first operating module sending a modified breaking signal ($S_S$) to generate a jerk value ($I_J$) that meets with first and second safety conditions, the second module sending a modified braking signal ($S_R$) to said braking system to generate a jerk value ($I_J$) that meets only the second safety condition and is greater than the jerk value generated by the modified braking signal ($S_S$) send by the first operating module.

2. The system according to claim 1, wherein said selected operating module (7) limits said electric braking signal ($I_F$, $S_{EM}$) so as not to exceed a predetermined threshold value.

3. The system according to claim 2, wherein said selected operating module (7) interpolates said electric braking signal ($I_F$, $S_{EM}$) by using the coefficients stored in said module.

4. The system according to claim 1, wherein said detection means (4) comprise at least an accelerometer or an inertial unit.

5. The system according to claim 1, wherein said jerk calculation module (6) calculates said jerk value ($I_J$) based on stored mathematical relationships.

6. The system according to claim 1, wherein said processing means (5) are integrated into said braking system (2) or into said driving control module (3).

7. The system according to claim 1, wherein said driving control module (3) is configured to send an emergency activation signal directly to said braking system (2) bypassing said processing means (5) in the case of an emergency.

8. An automatic/autonomous driving vehicle for public transport of passengers, said vehicle comprising a braking system (2) and a jerk control system according to claim 1.

9. A method for controlling the jerk in an automatic/autonomous drive vehicle, comprising the following steps:
   detecting an acceleration signal ($I_A$) of an automatic/autonomous drive vehicle;
   calculating the jerk value of the vehicle ($I_J$) based on the acceleration signal ($I_A$) detected;
   selecting a braking modality (7) of the automatic/autonomous drive vehicle;
   modifying/limiting a braking signal ($I_F$) set by a control module (3) of the automatic/autonomous drive vehicle according to a selected operating modality (7);

sending a modified braking signal ($S_S$, $S_R$) to the braking system (2) of said vehicle, wherein in a first operating modality a modified breaking signal ($S_S$) is sent to generate a jerk value ($I_J$) that meets with first and second safety conditions, and in a second operating modality, a modified braking signal ($S_R$) to said braking system is sent to generate a jerk value ($I_J$) that meets only the second safety condition and the jerk value in the second modality is greater than the jerk value in the first modality.

10. The jerk control method according to claim 9, comprising a step of emergency activation of the braking system (2), said emergency activation step activating said braking system (2) independently of said jerk value ($I_J$).

* * * * *